United States Patent
Venzal et al.

(10) Patent No.: US 11,067,460 B2
(45) Date of Patent: Jul. 20, 2021

(54) TORQUE SENSOR INCORPORATING AN ANGULAR POSITION SENSOR OF A ROTATING ELEMENT

(71) Applicants: Continental Automotive France, Toulouse (FR); Continental Automotive GmbH, Hannover (DE)

(72) Inventors: Simon-Didier Venzal, Toulouse (FR); Philippe Grass, München (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/961,509

(22) PCT Filed: Feb. 15, 2019

(86) PCT No.: PCT/FR2019/050343
§ 371 (c)(1),
(2) Date: Jul. 10, 2020

(87) PCT Pub. No.: WO2019/158871
PCT Pub. Date: Aug. 22, 2019

(65) Prior Publication Data
US 2020/0355564 A1    Nov. 12, 2020

(30) Foreign Application Priority Data
Feb. 15, 2018  (FR) ..................... 1851270

(51) Int. Cl.
*G01L 3/10* (2006.01)
*G01B 7/30* (2006.01)
*G01D 5/20* (2006.01)

(52) U.S. Cl.
CPC ............... *G01L 3/108* (2013.01); *G01B 7/30* (2013.01); *G01D 5/20* (2013.01)

(58) Field of Classification Search
None
See application file for complete search history.

(56) References Cited

U.S. PATENT DOCUMENTS

2009/0315544 A1* 12/2009 Takahashi ............... G01P 13/04
                                                                324/207.25
2014/0171258 A1*  6/2014 Boudet ................. B60W 10/08
                                                                    477/3

(Continued)

FOREIGN PATENT DOCUMENTS

DE    8700180 U1    6/1987
FR    3023611 A1    1/2016

OTHER PUBLICATIONS

English Translation of Written Opinion for International Application No. PCT/FR2019/050343, dated Apr. 15, 2019, 5 pages.

(Continued)

*Primary Examiner* — Lisa M Caputo
*Assistant Examiner* — Nigel H Plumb
(74) *Attorney, Agent, or Firm* — RatnerPrestia

(57) ABSTRACT

A torque sensor mounted on a rotating element in a motor vehicle, including at least one strain gauge and emitting an electrical signal as a function of the torsion experienced by the rotating element, the torque sensor having a moving part intended to be driven in rotation with the rotating element and including the strain gauge and a fixed part including a first printed circuit board. The torque sensor also acts as an angular-position sensor, the moving part bearing angularly distributed targets passing in succession past a first annular sector borne by the first board including a secondary receiver winding generating a sine signal, a secondary receiver winding generating a cosine signal, and a primary emitter winding inducing a voltage in the receiver windings.

15 Claims, 3 Drawing Sheets

(56) References Cited

U.S. PATENT DOCUMENTS

2018/0058969 A1 3/2018 Mokhbery et al.
2018/0080840 A1 3/2018 Gleeson

OTHER PUBLICATIONS

International Search Report and Written Opinion for International Application No. PCT/FR2019/050343, dated Apr. 15, 2019, 7 pages.
International Search Report and Written Opinion for International Application No. PCT/FR2019/050343, dated Apr. 15, 2019, 11 pages.

* cited by examiner

TORQUE SENSOR INCORPORATING AN ANGULAR POSITION SENSOR OF A ROTATING ELEMENT

CROSS REFERENCE TO RELATED APPLICATIONS

This application is the U.S. National Phase Application of PCT International Application No. PCT/FR2019/050343, filed Feb. 15, 2019, which claims priority to French Patent Application No. 1851270, filed Feb. 15, 2018, the contents of such applications being incorporated by reference herein.

FIELD OF THE INVENTION

The present invention relates to a torque sensor intended to be mounted on a rotating element in a motor vehicle, this torque sensor incorporating a sensor of the angular position of the rotating element.

BACKGROUND OF THE INVENTION

In general, control of power-transmission machines may entail the real-time measurement of physical parameters associated with an operating point. The need to measure the operating conditions of these systems can be explained by, and becomes more significant with, the search for ever greater performance as well as greater operational safety, and more particularly when associated with electronic control.

It is often judicious not only to measure the torque but also to measure an angular position of the rotating element. By way of a concrete example, this is already widely performed on modern motor vehicle engines. Specifically, without this limiting the scope of the present invention, a measurement of crank-angle on a motor vehicle internal combustion engine, often associated with a measurement of the position of a camshaft, became necessary a few years ago as a result of the emergence of electronically controlled injection and the need to know the position of the engine and of its pistons.

Knowledge of this position allows very fine control of the injection of fuel, and also of ignition, and allows these to be initiated at very precise instants. The introduction of electronic control has brought numerous advances, particularly an increase in the power delivered by the engines or a decrease in their fuel consumption.

Similarly, knowing how to measure the position, the speed or the currents of an engine involving electric motors has made it possible to create new engine layouts or significantly increase the performance of such engines. By way of associated example, a sufficiently precise measurement of the angular position of a synchronous motor allows the torque that it generates to be controlled more finely and fluctuations to be limited.

It is therefore known practice to measure an angular position of a shaft of an electric motor or a crankshaft of a combustion engine in a motor vehicle using an induction-type angular-position sensor. This is notably disclosed by document FR-A-3 023 611, incorporated herein by reference.

FIG. 2 shows an angular-position sensor 1 positioned on an electric motor 6 comprising a stator part 11 and a rotor part 12 connected to an output shaft 2. An angular-position sensor 1 is mounted fixedly with respect to the stator part 11 of the motor 6 and is suitable for detecting the position of targets 4 that are fastened to the rotor part 12 of the motor 6. In a known manner, the position of the targets 4 is detected by measurements of the output voltage of the position sensor 1.

While the measuring of angular position has been widespread practice for many years, using simple, robust and low-cost technology, the same is very much not the case with the measuring of torque. The arrival of better-performing technologies for measuring the torque on power shafts or components makes it possible to envision incorporating this measurement as standard in systems and designing new, more effective, reliable and better-performing control methods.

In the automotive field, this trend is not restricted to engines/motors alone. For example, the same is true for all the systems connected to the power transmission, such as the transmission gearboxes and more particularly automatic transmissions, differentials, . . . right down to the wheel systems and the braking systems.

However, there are factors that limit the development of such sensors in power transmission systems, these factors chiefly being their cost and their size.

Specifically, as far as the size is concerned, even though manufacturers are making considerable effort toward reducing the size of the sensors, these need to be incorporated into systems of which the size and, therefore, available space, is becoming increasingly limited, motor vehicle manufacturers having a clear objective to optimize the size and to lighten the weight of the vehicle.

Thus, on the one same shaft, it is necessary to use an angular-position sensor and a torque sensor, and this makes combining them difficult in terms of size and expensive. Nevertheless, there are analogies between a torque sensor and an angular-position sensor, with the presence of a moving part and of a fixed part of the sensor, the moving part of the angular-position sensor bearing rotary targets.

It is known practice from the prior art to use a torque sensor and an angular-position sensor for a motor vehicle steering column. This solution incorporates numerous position sensors, of which at least one makes it possible to measure the position of the rotor of the sensor which is its central part that rotates with respect to the body of the sensor which is its fixed part.

Torque measurement for its part is generally derived from the measurement from at least two of these position sensors. It requires for the column to be flexible enough that, when a torque is applied to the column, the column experiences torsion which leads to a difference in angular position between two distinct sections of the steering rod. The measurement of the deflection, which is the difference in relative position between two cells each secured to one of the two distinct sections, gives a picture of the torque on the column.

Usually, the two cells are magnetic concentrator circuits which make it possible to modulate a magnetic reluctance of the circuit as a whole and therefore a magnetic field strength at magnetic sensors, notably Hall-effect sensors, according to their relative position.

This torque-measurement solution cannot be transferred as-is to applications for measuring power torque because the deflection on power transmission shafts or components is too slight to afford the signal sufficient resolution and precision. An optical alternative is conceivable, but at prohibitive cost. Finally, such a construction would experience problems with sealing against the oils and pollutants present in the transmission.

SUMMARY OF THE INVENTION

The problem underlying the present invention is that of designing a torque sensor that is able to incorporate an angular-position sensor for dual measurement of torque and angular position on a rotating element in a motor vehicle while making as many as possible of the elements of the two sensors common to both so that the size of the sensor is not increased.

To this end, an aspect of the present invention relates to a torque sensor intended to be mounted on a rotating element in a motor vehicle, the torque sensor comprising at least one strain gauge applied to an adhesive material layer, said at least one strain gauge emitting an electrical signal as a function of the torsion experienced by the rotating element under the effect of a torque, the emitting and receiving of the electrical signal making it possible to measure the torque of the rotating element after processing by transmission means, the torque sensor having a moving part intended to be driven in rotation with the rotating element and comprising said at least one strain gauge, and a fixed part comprising a first printed circuit board, notable in that the torque sensor also acts as an angular-position sensor, the moving part bearing angularly distributed targets passing in succession, as the moving part rotates, past a first annular sector borne by the fixed first printed circuit board, the first annular sector comprising at least a first annular secondary receiver winding designed to generate a sine signal as a target passes past it, at least a second secondary receiver winding designed to generate a cosine signal as a target passes past it and at least one annular primary emitter winding designed to induce an electrical voltage in said secondary receiver windings.

It is not obvious how to modify a torque sensor in order to give it an additional function as an angular-position sensor while at the same time combining the two functions in the sensor. For example, the transmission of the detected torsion values which are sent to the fixed part of the sensor must not interfere with the calculation of the cosine and sine values performed on the secondary windings past which each target passes. The printed circuit board of the fixed part of the sensor needs to be specifically redesigned in order to dedicate one region of this board to the measuring of torque and another region to the primary and secondary windings. All of this very much prejudices the idea of combining a torque-measurement function with an angular-position-measurement function within the one same sensor.

The problem has been chiefly resolved by defining, on the printed circuit board, an annular sector specifically dedicated to the measurement of angular position. That makes it possible to avoid interference between the signals specifically dedicated to measuring torque and the signals dedicated to measuring angular position.

The technical effect obtained is that of having a torque sensor that can also act as an angular-position sensor. There is a highly synergistic effect between the torque sensor and the angular-position sensor because elements of the torque sensor are used as elements of the angular-position sensor, and the sensor thus obtained is not a simple juxtaposition of two different sensors. For example, the pressure means or the printed circuit board that form part of the mobile part of the torque sensor can serve as a support for the targets needed for an angular-position sensor, which means that the resulting sensor takes up no more space than a torque sensor while at the same time performing a second function.

This then achieves a limiting of cost and size of a sensor for simultaneous measurements of angular position and of torque of a power transmission system comprising a rotationally driven element.

The additional cost of such incorporation can be considered to be negligible because elements have been identified that can be made common to the two sensors. The active part of an inductive position sensor can be incorporated into the first printed circuit board in the fixed part of the torque sensor. The electronic components needed for the function of measuring angular position, and possibly the additional surface area of this printed circuit board that is required for the positioning of these components, are the only additional costs. The moving part of the position sensor may advantageously be machined into an element already present in the torque sensor. The additional cost then lies in the machining and processing steps needed for such a modification and possibly in the additional volume of material forming the targets.

Advantageously, etched into the fixed first printed circuit board are, on the one hand, at least one coil associated with torque measurement and making it possible to emit an alternating magnetic field, to power the moving part by induction, and to receive the electrical torque-measurement signal regarding the rotating element, and, on the other hand, in the first annular sector, at least three coils associated with angular-position measurement, at least one of which is a primary coil emitting an alternating magnetic field for the annular primary emitter winding and at least two of which are secondary coils etched inside said at least one primary coil for, respectively, the first secondary receiver winding and said at least one second secondary receiver winding, said at least one coil associated with torque measurement and said at least one primary coil emitting at different respective frequencies.

Advantageously, the fixed first printed circuit board is housed in a fixed reading member and divided into two concentric annular sectors with a second annular sector comprising said at least one coil associated with torque measurement and being the outermost of the two annular sectors, the second annular sector receiving, via electronic receiving and processing means incorporated into the fixed reading member, a signal emitted by electromagnetic emission means of a rotary detection member housed in the moving part, the rotary detection member facing the fixed reading member.

Advantageously, the adhesive material layer rests on one face of a substrate made of a rigid material able to ensure that it is held by friction against the rotating element via its opposite face to the one bearing the adhesive material layer, the moving part comprising pressure means surrounding the adhesive material layer and the substrate and being able to surround the rotating element and to press the opposite face of the substrate against the rotating element, the targets being borne either by the rotary detection member or by the pressure means, or else by means associated with the pressure means, this being on a face that faces toward the fixed first printed circuit board.

It is appropriate for the element bearing the targets advantageously to exhibit symmetry of revolution, for example adopting the form of a closed disk or of a closed ring surrounding the detection member. The targets are in the form of flat metallic elements in their construction. According to the known art of inductive angular-position measurement, these metallic elements may be disk portions, the number of which is generally dependent on the desired periodicity of the position measurement. These targets may form an integral part of the rotary pressure means by forming a particular crenelation of one of the faces of the pressure means.

As an alternative, the targets may be added-on metallic elements which are attached to regions of a housing in the form of a rotary ring, advantageously made of plastic, in the moving part, the targets being inserted into the rotary ring using overmolding.

Advantageously, the targets are borne by a rotary second printed circuit board that forms part of the rotary detection member, each target being obtained by locally engraving the second printed circuit board with the depositing of a target-forming metallic layer.

This represents an elegant and practical solution given that the small-sized targets are applied to the second printed circuit board where they take up very little space, provided that there is sufficient space available on this second printed circuit board. The targets may be engraved during the manufacture of the second printed circuit board.

Advantageously, when the targets are borne by the pressure means or means associated with the pressure means, each target is obtained by machining or by the addition of metallic inserts.

Advantageously, the pressure means are formed by two shell portions extending each other in order to form a complete shell, fixing means of the threaded rod type securing the two shell portions together, the two shell portions housing within them the substrate and the adhesive material layer, the rotary detection member being fixed against a circular exterior periphery of the two shell portions joined together.

The friction between the substrate and the rotating element is advantageously adjustable by the removable and adjustable pressure means, in particular by tightening two-part pressure means to clamp against each other. Therefore, there is significant freedom to adjust this friction. The removable and adjustable pressure means can be removed, which facilitates the mounting and removal of the torque sensor, which is something that cannot be obtained with strain gauges which are bonded in place. The pressure means at least partially surrounding the substrate and the adhesive material layer help to protect the one or more strain gauges disposed on the adhesive material layer.

It follows that, for an aspect of the present invention, there is strong synergy between the one or more strain gauges disposed on an adhesive material layer, a friction substrate rubbing against the rotating element, and the pressure means that helps to achieve maximum protection of the inside of the torque sensor and in particular of the one or more strain gauges, while allowing optimal adjustment of the friction between the rotating element and the torque sensor.

The durability of the one or more strain gauges is increased, with better protection of the one or more strain gauges combined with better accessibility to the one or more strain gauges during manufacturing, which at first sight is incompatible, being obtained.

The designation "shell portions" does not necessarily mean that the two portions are equivalent, but that they are complementary so as to form a complete shell when they are placed end-to-end. The shell portions protect the substrate and the adhesive material layer by surrounding them. Their introduction around the rotating element and the rest of the torque sensor is facilitated by the fact that the pressure means that they form are in the form of two shell portions, which are symmetrically disposed relative to the rotating element.

It is advantageous to use such shell portions in order to give them the auxiliary function of supporting the targets. Specifically, the shell portions completely surround the rotating element and meet the target-support criteria by exhibiting symmetry of revolution. The fact that these shell portions are metallic and strong is also an advantage for the supporting of the targets, because the targets can be machined directly into the shell portions.

Advantageously, the fixed reading member and the detection member are housed in a respective housing, each in the form of a ring, these respectively being fixed and mobile, which may or may not be incomplete, the fixed and mobile rings being spaced apart by a gap of predetermined dimension allowing wireless communication between the rings and a positioning of the targets with respect to the first printed circuit board that modifies the magnetic coupling between the primary winding and the two secondary windings when facing the first annular sector.

The rotary ring can be in the form of a ring portion, while being incomplete since it is not closed in order to, for example, only surround the circular outer periphery of one of the shell portions.

Advantageously, the housing of the fixed reading member is aligned with the housing of the detection member along a longitudinal axis of rotation of the detection member, or the housing of the fixed reading member surrounds the housing of the detection member from a distance.

The reading and detection members may be disposed axially along the longitudinal axis of rotation of the detection member, and this is what is shown in the figures of the present application. However, the reading and detection members may be disposed radially.

In the former instance, the overall size of the sensor is effective in terms of its length along an axis of rotation of the rotating element, and in the latter case, the sensor is not as long, but may be more bulky in terms of its height about the rotating element. The housing of the rotary detection member is, however, less accessible in the latter instance, and access to the housing of the detection member may entail removal of the housing of the fixed reading member.

In the former instance, this rotary ring may advantageously not be closed in order to allow the assembly to be mounted laterally relative to a rotation shaft by way of rotating element, as opposed to mounting via one of the longitudinal ends of the shaft, which would then necessarily require the removal of one of the transmission elements connected with the shaft. By contrast, when the targets are borne by the rotary ring, it is advantageous for this rotary ring to be complete or almost complete, extending completely around the rotary detection element.

Thus, the rotary ring may also be complete, completely surrounding the pressure means, for example in the form of shell portions. This rotary ring is wired to the transmission means of the torque sensor in the vicinity of the one or more strain gauges and is advantageously used to communicate electromagnetically with the rest of the electronic signal processing means that are disposed at a distance from the torque sensor.

The rotary ring, the transmission means borne by the detection member, and the one or more strain gauges all rotate as one, hence the possibility of a wired connection between them.

Advantageously, the targets are of roughly parallelepipedal shape with two, inner and outer, rounded faces intended to be concentric with the rotating element, the length of the inner rounded face being shorter than the length of the outer rounded face.

Advantageously, said at least one strain gauge is in the form of a micro-electromechanical system with piezoresistive cells.

One particular type of strain gauge may for example be a micro-electromechanical system also known by its abbreviation "MEMS" involving piezoresistive cells. The micro-electromechanical system may comprise four cells, the resistances of which allow a complete "Wheatstone bridge" to be produced. The cells may be placed at 90° to each other to form a square, with this condition nevertheless not being required for a Wheatstone bridge.

An aspect of the invention also relates to an assembly of a rotating element in a motor vehicle and a torque sensor, notable in that the torque sensor is as described hereinabove while also performing an angular-position-sensor function.

Advantageously, the rotating element is a transmission shaft or a flywheel.

BRIEF DESCRIPTION OF THE DRAWINGS

Other features, aims and advantages of the present invention will become apparent on reading the detailed description that follows and on examining the appended drawings given by way of non-limiting examples, and in which.

DETAILED DESCRIPTION OF THE PREFERRED EMBODIMENTS

In what follows, the torque sensor and the angular-position sensor are referenced by the same unique reference 1 given that they have elements that have been made common to both and are not entirely differentiable from one another. Their combination is not the result of a juxtaposition of two sensors but of a combination of the two sensors with interaction between the two sensors and with elements of the sensor being made common to both.

Figure 1:
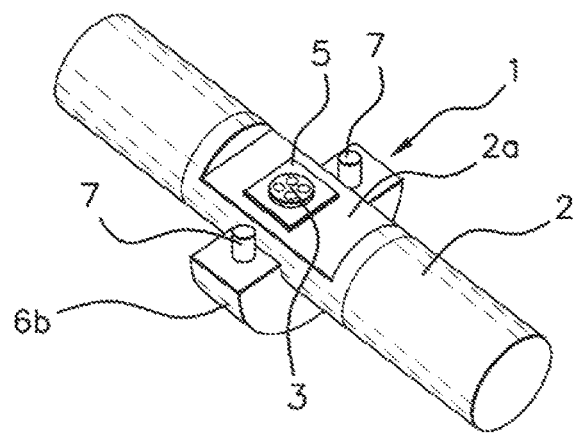
FIG. 1 is a schematic depiction of a perspective view of a rotating element equipped with one embodiment of a torque sensor, one shell portion having been removed in this FIG. 1 in order to show the strain gauges, the torque sensor shown in this FIG. 1 being able to be modified in order to incorporate an angular-position sensor to become a sensor according to an aspect of the present invention.

In the figures, the reading member and fixed ring, on the one hand, and the detection member and rotary ring, on the other hand, are respectively denoted by the same references given that the rings at least partially surround and conceal their associated member. FIG. 1 shows a transmission shaft by way of rotating element 2, on which is mounted a torque sensor 1 of which part has been omitted in this figure in order to show a substrate 5 and strain gauges 3. The embodiment shown in this figure is not, however, limiting to an aspect of the present invention.

In FIG. 1, the torque sensor has an adhesive material layer resting on one face of a substrate 5 made of a rigid material and to which strain gauges are bonded, able to ensure that it is held by friction against the rotating element 2 via its opposite face to the one bearing the adhesive material layer. In order to apply and adjust the friction, the torque sensor 1 comprises removable and adjustable pressure means 6b surrounding the adhesive material layer and the substrate 5, the upper half of these pressure means having been omitted in FIG. 1. It is also possible not to use pressure means in a torque sensor, and for the strain gauges 3 to be bonded directly onto the rotating element 2.

The pressure means 6b can be removed and the pressure that these pressure means exert can be adjustable, advantageously by the tightening of the fixing means 7 that join these pressure means 6b together.

The opposite face of the substrate 5 to the one bearing the adhesive material layer and, therefore, the one or more strain gauges 3 is not necessarily flat and will act as a detection interface with the rotating element 2. The opposite face advantageously conforms to the profiles of the rotating element 2, by being flat when the rotating element has a flat surface 2a, but being able to assume another form suitable for the rotating element 2 the torque of which is to be measured.

Figure 2:
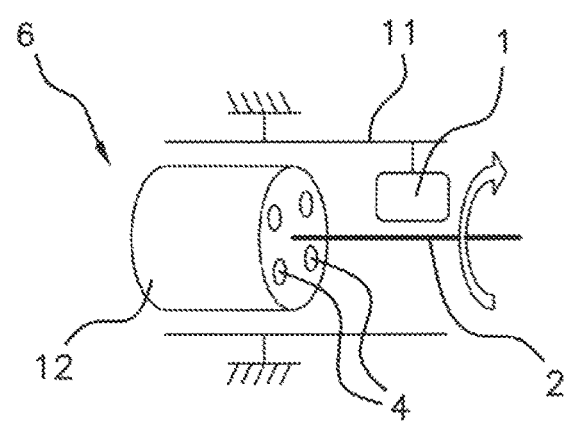
FIG. 2 is a schematic depiction of a perspective view of a rotating element in the form of an engine equipped with one embodiment of an angular-position sensor, the angular-position sensor shown in this FIG. 2 being able to be modified in order to be incorporated into a torque sensor to form a sensor according to an aspect of the present invention.

Referring once again to FIG. 2, this figure schematically depicts an electric motor 6 comprising a stator part 11 and a rotor part 12 which is connected to an output shaft acting as rotating element 2 within the meaning of an aspect of the present invention. This is nonlimiting and the rotating element 2 could be driven by a combustion engine or by any other member present in a motor vehicle.

With reference more particularly to FIGS. 1, 4 to 8, an aspect of the present invention relates to a torque sensor 1 intended to be mounted on a rotating element 2 in a motor vehicle. As can be seen in FIG. 1, the torque sensor 1 comprises at least one strain gauge 3 disposed on an adhesive material layer.

In one preferred embodiment, the strain gauges 3 may be in the form of a micro-electromechanical system with piezoresistive cells.

Figure 6:
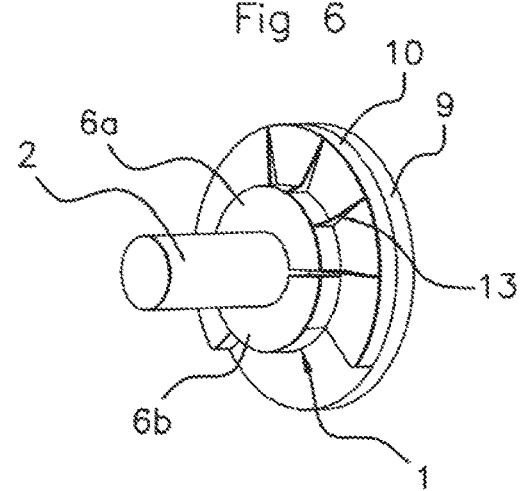
FIGS. 6 to 8 are schematic depictions of perspective views of one embodiment of the moving part of a sensor according to an aspect of the present invention, the fixed part of the sensor also being shown in FIG. 6, the pressure means that press the moving part onto the rotating element being in the form of shell portions in this optional embodiment of the present invention, a protective ring having been omitted in FIG. 8.
Figure 7:
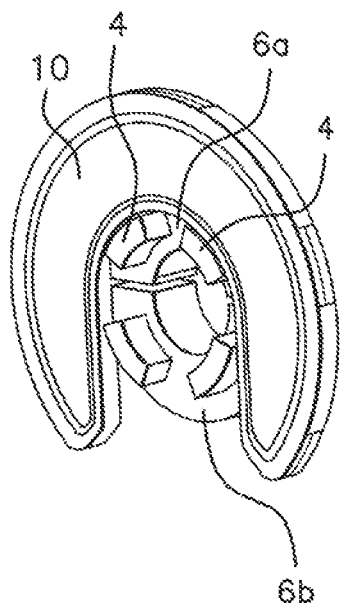
Figure 8:
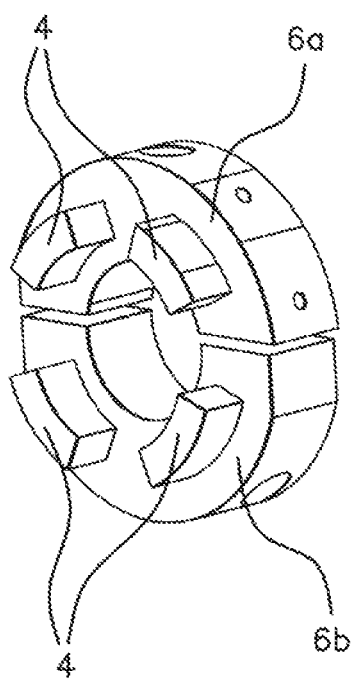

The pressure means 6a, 6b which will be described in greater detail later, and which are shown partially in FIG. 1 but shown fully in FIGS. 6 to 8 are not essential for implementation of an aspect of the present invention, notably embodying them in the form of shell portions 6a, 6b. An aspect of the present invention can be implemented with other pressure means 6a, 6b or with another way of embodying how the one or more strain gauges 3 are applied to the adhesive material.

For example, the pressure means may be produced differently, for example as a single piece fitted with a hinge, or as a flexible clamping component, etc.

In the known way, the one or more strain gauges 3 emit an electric signal as a function of the torsion experienced by the rotating element 2 under the effect of a torque. An emission and reception of the electrical signal make it possible to measure the torque of the rotating element 2 following processing by transmission means. There are wired transmission means in the moving part and wireless transmission means between the moving part and the fixed part.

Figure 4:
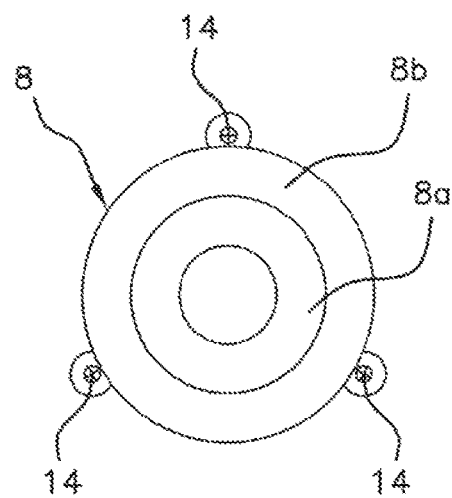
FIG. 4 is a schematic depiction of a face-on view of a printed circuit board housed in a fixed part of the sensor according to an aspect of the present invention, the board having two annular sectors to respectively perform the functions of angular-position sensor and of torque sensor.
Figure 5:
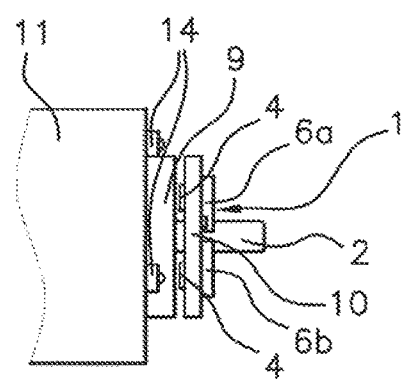
FIG. 5 is a schematic depiction of a side view of one embodiment of a torque sensor according to an aspect of the invention, incorporating an angular-position-sensor function with targets and fixed and moving parts.

With reference notably to FIGS. 1, 4 and 5, the torque sensor 1 has a rotary moving part intended to be driven in rotation with the rotating element 2. This moving part comprises the one or more strain gauges 3 and means for creating and emitting electrical signals to make it possible to measure the torque of the rotating element 2. The sensor 1 comprises a fixed part comprising a first printed circuit board 8 for processing the signals emitted by the moving part and received by the fixed part.

The moving part comprises the pressure means 6a, 6b, the targets 4 and a housing, advantageously in the form of a complete or incomplete ring housing a detection member 10. The detection member 10 may comprise a printed circuit board which will be referred to subsequently as a second printed circuit board.

The fixed part of the sensor comprises the reading member 9 enveloped in a fixed housing, advantageously in the form of a ring. The reading member 9 comprises the first printed circuit board referenced 8 in FIG. 4 and means for receiving the signals sent by the detection member 10.

The recent success and wider uptake of wireless communication technology, notably NFC (Near Field Communication), Wi-Fi, Bluetooth®, etc. has allowed industry to develop and bring into production torque sensors 1 that employ these wireless technologies. A known, robust and high-performance contact-type torque measurement technology, such as measurement on the basis of one or more strain gauges 3 in a moving part of the sensor 1 is thus associated with a wireless communication technology so that measured data can be transmitted to a fixed part thus allowing torque to be measured on a rotary element such as a shaft.

While this type of solution has already existed for some years for instrumentation sensors 1, which are themselves relatively expensive, it has been possible to take advantage of the more widespread sharing of the latter wireless communications solutions to allow industry to propose low-cost solutions. Torque sensors 1 are, for example, nowadays fitted to the motor control systems of electric bicycles.

FIGS. 5 to 8 show pressure means 6a, 6b that press the one or more strain gauges 3, which are not visible in these figures, against the rotating element 2, which are not visible in FIGS. 7 and 8. These pressure means 6a, 6b may be supplemented by a rotary detection member 10 which can be housed in a rotary plastic housing, advantageously in the form of a ring. The pressure means 6a, 6b and the rotary detection member 10 housed, where appropriate, in the rotary plastic housing, form the moving part of the sensor 1 which part is intended to be driven in rotation with the rotating element 2.

In applications to the measuring of torque on rotating elements, these pressure means 6a, 6b usually adopt the form of a collar, of a torus, or of some other component exhibiting symmetry of revolution which is able to surround the rotary sensitive element of the torque sensor 1 and clamp it against the rotating element 2 thus securing it thereto. These pressure means 6a, 6b are advantageously made of metal, which allows them to withstand the forces involved during the rotation, the rotational acceleration, or else the vibrations of the system, and therefore to ensure the robustness of the assembly and the retention of the rotary element throughout the life of the sensor 1.

The rotary detection member 10 collects the torsion values measured by the one or more strain gauges 3 and comprises wireless means of transmitting these values to a non-rotary reading member 9 which will now be described and which forms part of a fixed part of the sensor 1.

The sensor 1 therefore comprises a fixed part comprising a non-rotary reading member 9 advantageously housed in a fixed housing secured to a first printed circuit board 8 and means of receiving the data sent by the wireless transmission means from the rotary detection member 10. The fixed part of the torque sensor 1 faces the mobile part of the sensor 1 while being distant from the mobile part, but sufficiently close thereto as to allow wireless transmission between the two parts.

According to an aspect of the invention, the torque sensor 1 also acts as an angular-position sensor 1. In order to do that, the moving part bears targets 4, visible in FIGS. 5 and 7 to 8, angularly distributed and moving consecutively, as the moving part rotates, past a first annular sector 8a borne by the fixed first printed circuit board 8, as illustrated in FIG. 4. Thus, part of the first printed circuit board 8 is dedicated to the angular-position sensor so as to avoid interference during operation between the torque sensor and the angular-position sensor thus associated.

Figure 3:
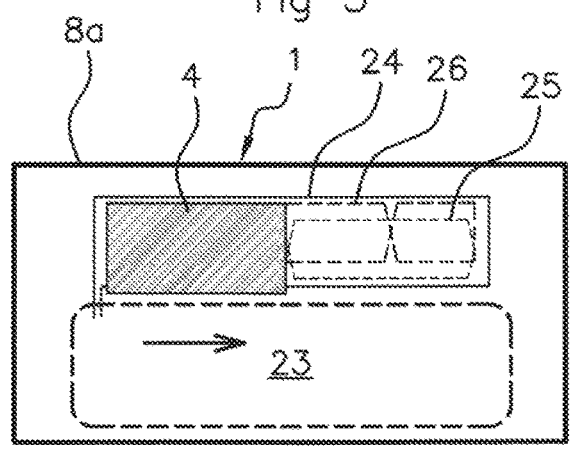
FIG. 3 is a schematic depiction of a plan view, from above, of an annular sector of a printed circuit board housed in a fixed part of a sensor according to the present invention, this annular sector being depicted as rectangular in shape in FIG. 3 and performing the function of angular-position sensor in a torque sensor according to an aspect of the present invention when associated with targets borne by a moving part of the torque sensor.

With reference to FIG. 3 in particular, in order to allow the sensor 1 to perform its angular-position-sensor function, the first annular sector 8a comprises at least one annular first secondary receiver winding 25 designed to generate a sine signal as a target 4 moves past it, and at least one second secondary receiver winding 26 designed to generate a cosine signal as a target 4 moves past it. The first annular sector 8a also comprises at least one annular primary emitter winding 24 designed to induce an electrical voltage in said secondary receiver windings 25, 26.

As illustrated in FIG. 3, the angular-position sensor defines a spatial measurement window, in the form of an annular sector, through which the targets 4 periodically pass as the rotor part 12 rotates. For the sake of clarity, the first annular sector 8a of the first printed circuit board has not been depicted as annular but as being linear, namely "flat", while being part of the first printed circuit board of the fixed part of the sensor 1.

With reference to all of the figures, the sensor 1 in the known way comprises a housing in which is mounted the first printed circuit board 8 of which a part is dedicated to the angular-position measurements via its first annular sector 8a. In practice, each target 4 also takes the form of an annular sector smaller in size than the first annular sector 8a.

In the context of an aspect of the present invention, the printed circuit board used for the angular-position sensor 1 is the same as the first printed circuit board 8 in the fixed part of the torque sensor 1. The annular sector referred to as the first annular sector 8a may be a complete annulus just as it may be an annulus portion.

In a known manner, a primary winding allows a magnetic field to be generated as current flows through said primary winding. The magnetic field thus created is perceived by the secondary windings, and induces a current in the secondary windings. The targets 4, borne by the moving part of the torque sensor 1 and forming the complementary part to the printed circuit board portion described hereinabove, are made from a conducting material so as to allow eddy currents to circulate. These targets 4 move relative to and past the windings 24, 25, 26 as the rotationally driven element rotates.

When a target 4 is located facing the portion that forms the first annular sector 8a of the first printed circuit board 8, the target 4 modifies the magnetic coupling between the primary winding 24 and the two secondary windings 25, 26. In a known manner, the primary winding 24 is referred to as the primary emitter winding 24 whereas the secondary windings 25, 26 are referred to as receiver windings. So, by measuring the electrical voltages across the terminals of the receiver windings 25, 26, it is possible to deduce the precise position of the target 4 facing the first annular sector 8a. As a result, it is possible to deduce the angular position of the rotationally driven element referenced 2 in FIGS. 1 and 2.

In a more detailed way, in the presence of a target 4 facing the first annular sector 8a of the first printed circuit board 8, the receiver windings 25, 26 placed in proximity to said target 4 see an amount of flux of the magnetic field that is lower than if the target 4 were absent. If, for example, a receiver winding 25, 26 consists of two loops of opposite orientation and if the target 4 moves over one and then the other of these loops, this receiver winding 25, 26 sees, with respect to a zero average value, a relative increase and then a relative decrease in the amount of flux of the magnetic field that passes through it.

In practice, the receiver windings 25, 26 are of different natures. With reference to FIG. 3, it is possible to make a distinction between, on the one hand, a receiver winding of the "sine" type 25, which is designed to deliver a sine signal as a target 4 passes through the measurement window, and a receiver winding of the "cosine" type 26, which is designed to deliver a cosine signal as a target 4 passes past the first annular sector 8a of the first printed circuit board 8. The sine/cosine signals are temporally correlated, through the calculation of the arctangent, in order to determine precisely the position of the target 4.

What is meant by a target 4 that forms sine SIN and cosine COS signals, is not only a single target 4 that interacts with receiver windings but also several consecutive target portions or several consecutive targets that are angularly offset and that interact simultaneously with receiver windings.

This is illustrated in FIG. 3, the reference 23 corresponding to a control unit for controlling the primary winding 24 and for processing the signals emanating from the receiver windings 25, 26.

With reference to all the figures, engraved on the fixed first printed circuit board 8 is at least one coil associated with a torque measurement able to emit an alternating magnetic field in order by induction to power the moving part and to receive the electrical signal indicative of the measurement of the torque of the rotating element 2.

If the fixed part of the sensor 1, notably in a fixed reading member 9, then already incorporates within the first printed circuit board 8 a reading coil and/or a remote power-supply coil of which the characteristics, such as the frequency of oscillation or the position relative to the targets 4 are compatible with the inductive-measurement requirements, it may advantageously be conceived of using this as the primary coil of the inductive angular-position measurement system for the angular-position-measurement part of the sensor 1.

Furthermore, at least three coils associated with an angular-position measurement are engraved in the first annular sector 8a. These three coils are at least one primary coil emitting an alternating magnetic field for the annular primary emitter winding 24 and at least two secondary coils engraved within said at least one primary coil for, respectively, the first secondary receiver winding 25 and said at least one second secondary receiver winding 26.

The coils of the position-sensor function may offer a required periodicity over 360°. In that case, the target or targets 4 may then be either recessed or salient, for example in the form of successive recesses or teeth.

In order to avoid interference between the measurements of the torque function of the sensor 1 and the angular-position function of the sensor 1, at least the coil associated with torque measurement and the primary coil or coils for the angular-position sensor 1 emit at different respective frequencies.

As can be seen in FIGS. 4 and 5 considered in combination, the fixed part of the sensor 1 may be secured to a casing 11 associated with the rotating element 2 via at least two attachment points 14, and preferably three, as shown in FIG. 4. These attachment points 14 are advantageously removable and notably in the form of screws.

The fixed first printed circuit board 8 may be housed inside a reading member 9 fixed in the fixed part. This first printed circuit board 8 may be divided into two concentric annular sectors 8a, 8b, as shown in FIG. 4, these annular sectors each forming a complete respective annulus.

The first annular sector 8a may be the innermost of the two annular sectors 8a, 8b, while an outermost second annular sector 8b is also housed in the fixed reading member 9, the second annular sector 8b receiving, via electronic receiving and processing means incorporated into the fixed reading member 9, a signal emitted by the electromagnetic emission means of the rotary detection member 10 previously mentioned as being housed in the moving part of the sensor 1.

The rotary detection member 10 faces the fixed reading member 9 while at the same time there is maintained between the two a relatively short distance that allows for wireless transmission of data from the detection member 10 contained in the signal emitted by the electromagnetic emission means of the moving part.

A housing of the fixed reading member 9 may be aligned with the housing of the detection member 10 along a longitudinal axis of rotation of the detection member 10. This embodiment is shown in the figures and corresponds to an axial disposition of the housings. As an alternative, the housing of the fixed reading member 9 may surround the housing of the detection member 10 from a distance, this corresponding to an axial disposition of the housings which is not shown in the figures.

FIGS. 6 to 8 show a preferred embodiment of a torque sensor 1 that is particularly well-suited to performing the additional function of angular-position sensor 1, via certain specific adaptations. It should be borne in mind that there are other embodiments of a torque sensor 1 which can be considered for becoming a sensor 1 with an angular-position-detection function.

For example, in another embodiment, the one or more strain gauges 3 may be placed directly in contact with the rotating element 2, notably by being bonded to the rotating element and be subjected directly to the torsion of the rotating element 2 by being in direct contact with that element.

In FIGS. 6 to 8, the torque sensor 1 comprises removable and adjustable pressure means 6a, 6b surrounding the substrate previously referenced 5 in FIG. 1. Removable means that the pressure means 6a, 6b can be removed and adjustable means that the pressure exerted by these means 6a, 6b is adjustable. The pressure means 6a, 6b may adopt the form of a collar made up of two shell portions 6a, 6b, advantageously made of steel, as shown in FIGS. 6 to 8.

The exterior body of the sensor 1, essentially formed by the pressure means 6a, 6b together with, where appropriate, a rotary ring enveloping the rotary detection member 10 by way of housing. This rotary ring may or may not be incomplete, and is shown as incomplete in FIGS. 6 and 7 substantially in the shape of a horseshoe or of a C. An incomplete rotary ring 10 means that the rotary ring does not go all the way around the two, upper and lower, shell portions 6a, 6b.

These shell portions 6a, 6b can each assume the form of a C. The shell portions 6a, 6b can be assembled and clamped together by tightening two M6 clamping screws by way of threaded rods 7, visible in FIG. 1, located on either side of one same shell portion. One of the shell portions 6a, 6b may have a central flat situated on its internal face, and this shell portion may be the upper shell portion 6a.

As can be seen particularly in FIGS. 5 and 8, the two shell portions 6a, 6b that are secured together have a circular outer periphery. Visible notably in FIG. 5, it is to this circular outer periphery that an incomplete or complete rotary ring 10 having an outer diameter that may or may not be greater than the outer periphery of the two shell portions 6a, 6b is fixed.

The incomplete or complete rotary ring 10 can be secured to at least one shell portion 6a, the rotary ring 10 and the shell portion 6a being intended to be made to rotate with the rotating element 2.

The incomplete or complete rotary ring 10 may comprise an outer perimeter connected to at least one of the shell portions 6a, 6b by ribs. Only one of the ribs is referenced 13 in FIG. 6 that shows them, but the description provided for this rib referenced 13 relates to all the ribs.

The ribs 13 may extend substantially radially relative to a median axis of the rotating element 2. Each of the ribs 13 may have a curved end facing the one or more shell portions 6a, 6b in order to be at least partially applied against the outer periphery of the shell portions 6a, 6b and to be fixed on the outer periphery by at least one connection element. All the curved ends of the ribs 13 are traversed by a connection element, for example of the threaded rod type.

The rotary ring 10 is wired to the transmission means located in the vicinity of the one or more strain gauges referenced 3 in FIG. 1. Therefore, the rotary ring 10 comprises wired reception means for receiving the signal transmitted by the transmission means, advantageously ports for soldering connection wires.

The rotary ring 10 also comprises emission means for electromagnetically emitting the received signal to the outside, advantageously toward a fixed ring which is fixed, forming the housing enveloping the fixed reading member 9 of the fixed part of the sensor 1.

As can be seen in FIGS. 5 and 6, the rotary ring 10 and the fixed ring 9 may have similar diameters, being spaced away from one another by a gap that allows a wireless connection between the rotary ring 10 and the fixed ring 9.

It is to the moving part of the torque sensor 1 that the targets 4 are added so as to perform the function of detecting the angular position of the rotating element 2. There are a number of possible embodiments.

In a first embodiment, the targets 4 may be borne by a rotary second printed circuit board incorporated into the rotary detection member 10 of the moving part. In a second embodiment, the targets 4 may be positioned on the pressure means 6a, 6b borne by the moving part. In a third embodiment, the targets 4 may be positioned on means associated with the pressure means 6a, 6b, for example on the housing enveloping the detection member 10 as being in the form of a rotary ring, as described hereinabove.

As shown in FIGS. 5 and 8 in which the pressure means may be formed of two shell portions 6a, 6b extending one another to form a complete shell, the targets 4 may be produced on the two shell portions 6a, 6b.

Because these two shell portions 6a, 6b may be metallic, the targets 4 may be formed by machining the shell portions 6a, 6b, notably on a face of each shell portion that faces toward the fixed first printed circuit board 8. Such may be the case for the housing that forms a ring enveloping the rotary detection member 10 when this housing is made of metal, something which could equally not be the case.

By construction, one of the flanks of each of the two shell portions 6a, 6b faces the fixed reading member 9, and more particularly faces the set of coils used for inductive position measurement. These flanks, complemented by the two planar or non-planar shell portions 6a, 6b, may be machined to reveal crenelations, for example approximately 3 mm in height. Assembling the two shell portions 6a, 6b allows these crenelations to be assembled into a revolving periodic pattern forming a set of targets 4 suited to inductive measurement of the angular position of the rotating element 2 and therefore of a transmission assembly on which the rotating element 2 is mounted. The shell portions 6a, 6b are advantageously metallic.

On a non-metallic support surface supporting the targets 4, the targets 4 may be formed by the addition of metallic inserts, each metallic insert corresponding to a target. The metallic inserts may be positioned on a face of the support that faces toward the fixed first printed circuit board 8 for each of the two shell portions 6a, 6b.

For example, metallic targets 4 may be overmolded in the rotary ring 10 by being at least partially coated in the rotary ring 10, notably using overmolding.

The targets 4 may be produced on the rotary second printed circuit board by engraving a layer of metal on the second printed circuit board housed in the rotary detection member 10, advantageously enveloped in a rotary housing. This can be done on that face of the second printed circuit board that faces the first printed circuit board 8, the rotary second printed circuit board being electrically conducting in the region of the targets 4 as a result of this engraving of a metallic layer, advantageously made of copper. The second printed circuit board is not visible in the figures because it is hidden by the detection member 10 and its ring-shaped housing.

As can be seen particularly in FIG. 8, the targets 4 may be of roughly parallelepipedal shape with quadrangular faces comprising two, inner and outer, rounded faces intended to be concentric with the rotating element, the length of the inner rounded face being shorter than the length of the outer rounded face.

An aspect of the invention also relates to an assembly of a rotating element 2 in a motor vehicle and of a torque sensor 1 as mentioned hereinabove combining the torque-sensor and angular-position-sensor functions. The rotating element 2 may be a transmission shaft or a flywheel.

The invention claimed is:

1. A torque sensor intended to be mounted on a rotating element in a motor vehicle, the torque sensor comprising:
    at least one strain gauge applied to an adhesive material layer, said at least one strain gauge emitting an electrical signal as a function of torsion experienced by the rotating element under the effect of a torque, the torque sensor having a moving part intended to be driven in rotation with the rotating element and comprising said at least one strain gauge, and a fixed part comprising a first printed circuit board, wherein the torque sensor also acts as an angular-position sensor, the moving part bearing angularly distributed targets passing in succession, as the moving part rotates, past a first annular sector borne by the fixed first printed circuit board, the first annular sector comprising at least a first annular secondary receiver winding designed to generate a sine signal as a target passes past it, at least a second secondary receiver winding designed to generate a cosine signal as a target passes past it and at least one annular primary emitter winding designed to induce an electrical voltage in said secondary receiver windings.

2. The torque sensor as claimed in claim 1, wherein etched into the fixed first printed circuit board are, on the one hand, at least one coil for measuring torque and making it possible to emit an alternating magnetic field, to power the moving part by induction, and to receive the electrical torque-measurement signal regarding the rotating element, and, on the other hand, in the first annular sector, at least three coils for measuring angular-position, at least one of which is a primary coil emitting an alternating magnetic field for the annular primary emitter winding and at least two of which are secondary coils etched inside said at least one primary coil for, respectively, the first secondary receiver winding and said at least one second secondary receiver winding, said at least one coil for the torque measurement and said at least one primary coil emitting at different respective frequencies.

3. The torque sensor as claimed in claim 2, wherein the fixed first printed circuit board is housed in a fixed reading member and divided into two concentric annular sectors with a second annular sector comprising said at least one coil for the torque measurement and being the outermost of the two annular sectors, the second annular sector receiving, via electronic receiving and processing means incorporated into the fixed reading member, a signal emitted by electromagnetic emission means of a rotary detection member housed in the moving part, the rotary detection member facing the fixed reading member.

4. The torque sensor as claimed in claim 3, wherein the adhesive material layer rests on one face of a substrate made of a rigid material able to ensure that it is held by friction against the rotating element via its opposite face to the one bearing the adhesive material layer, the moving part comprising pressure means surrounding the adhesive material layer and the substrate and being able to surround the rotating element and to press the opposite face of the substrate against the rotating element, the targets being borne either by the rotary detection member or by the pressure means, this being on a face that faces toward the fixed first printed circuit board.

5. The torque sensor as claimed in claim 4, wherein the targets are borne by a rotary second printed circuit board that forms part of the rotary detection member, each target being obtained by locally engraving the second printed circuit board with the depositing of a target-forming metallic layer.

6. The torque sensor as claimed in claim 5, wherein the pressure means are formed by two shell portions extending each other in order to form a complete shell, fixing means of the threaded rod type securing the two shell portions together, the two shell portions housing within them the substrate and the adhesive material layer, the rotary detection member being fixed against a circular exterior periphery of the two shell portions joined together.

7. The torque sensor as claimed in claim 4, wherein when the targets are borne by the pressure means, each target is obtained by machining or by the addition of metallic inserts.

8. The torque sensor as claimed in claim 7, wherein the pressure means are formed by two shell portions extending each other in order to form a complete shell, fixing means of the threaded rod type securing the two shell portions together, the two shell portions housing within them the substrate and the adhesive material layer, the rotary detection member being fixed against a circular exterior periphery of the two shell portions joined together.

9. The torque sensor as claimed in claim 4, wherein the pressure means are formed by two shell portions extending each other in order to form a complete shell, fixing means of the threaded rod type securing the two shell portions together, the two shell portions housing within them the substrate and the adhesive material layer, the rotary detection member being fixed against a circular exterior periphery of the two shell portions joined together.

10. The sensor as claimed in claim 4, wherein the fixed reading member and the rotary detection member are housed in a respective housing, each in the form of a ring, these respectively being fixed and mobile, which may or may not be incomplete, the fixed and mobile rings being spaced apart by a gap of predetermined dimension allowing wireless communication between the rings and a positioning of the targets with respect to the first printed circuit board that modifies the magnetic coupling between the primary winding and the two secondary windings when facing the first annular sector.

11. The sensor as claimed in claim 10, wherein the housing of the fixed reading member is aligned with the housing of the detection member along a longitudinal axis of rotation of the detection member, or the housing of the fixed reading member surrounds the housing of the detection member (10) from a distance.

12. The sensor as claimed in claim 1, wherein the targets are of roughly parallelepipedal shape with two, inner and outer, rounded faces intended to be concentric with the rotating element, the length of the inner rounded face being shorter than the length of the outer rounded face.

13. The torque sensor as claimed in claim 1, wherein said at least one strain gauge is in the form of a micro-electro-mechanical system with piezoresistive cells.

14. An assembly of a rotating element in a motor vehicle and a torque sensor, the torque sensor comprising:

at least one strain gauge applied to an adhesive material layer, said at least one strain gauge emitting an electrical signal as a function of torsion experienced by the rotating element under the effect of a torque, the torque sensor having a moving part intended to be driven in rotation with the rotating element and comprising said at least one strain gauge, and a fixed part comprising a first printed circuit board, wherein the torque sensor also acts as an angular-position sensor, the moving part bearing angularly distributed targets passing in succession, as the moving part rotates, past a first annular sector borne by the fixed first printed circuit board, the first annular sector comprising at least a first annular secondary receiver winding designed to generate a sine signal as a target passes past it, at least a second secondary receiver winding designed to generate a cosine signal as a target passes past it and at least one annular primary emitter winding designed to induce an electrical voltage in said secondary receiver windings, and wherein the torque sensor.

15. The assembly as claimed in claim 14, wherein the rotating element is a transmission shaft or a flywheel.

\* \* \* \* \*